United States Patent Office 3,067,375
Patented Dec. 4, 1962

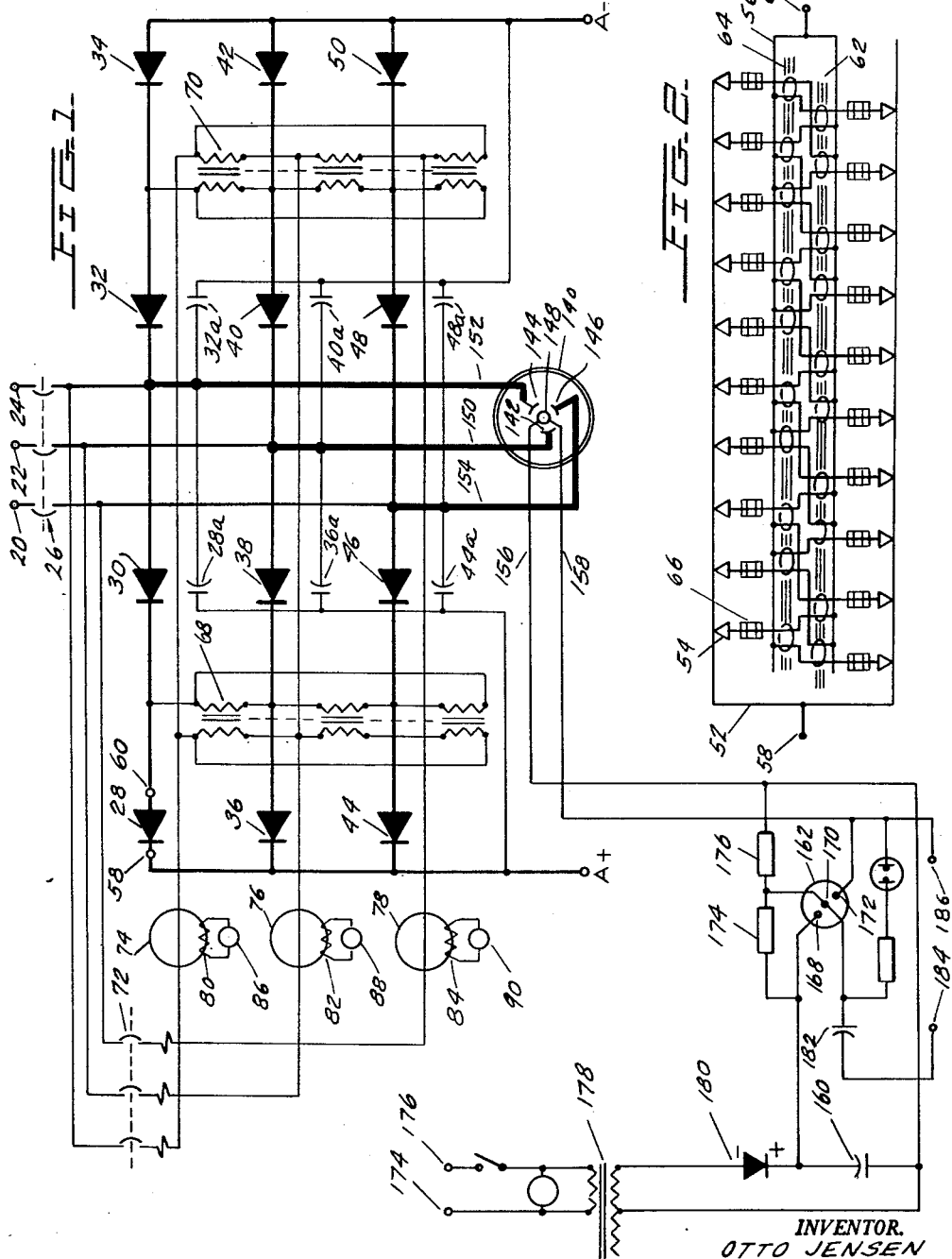

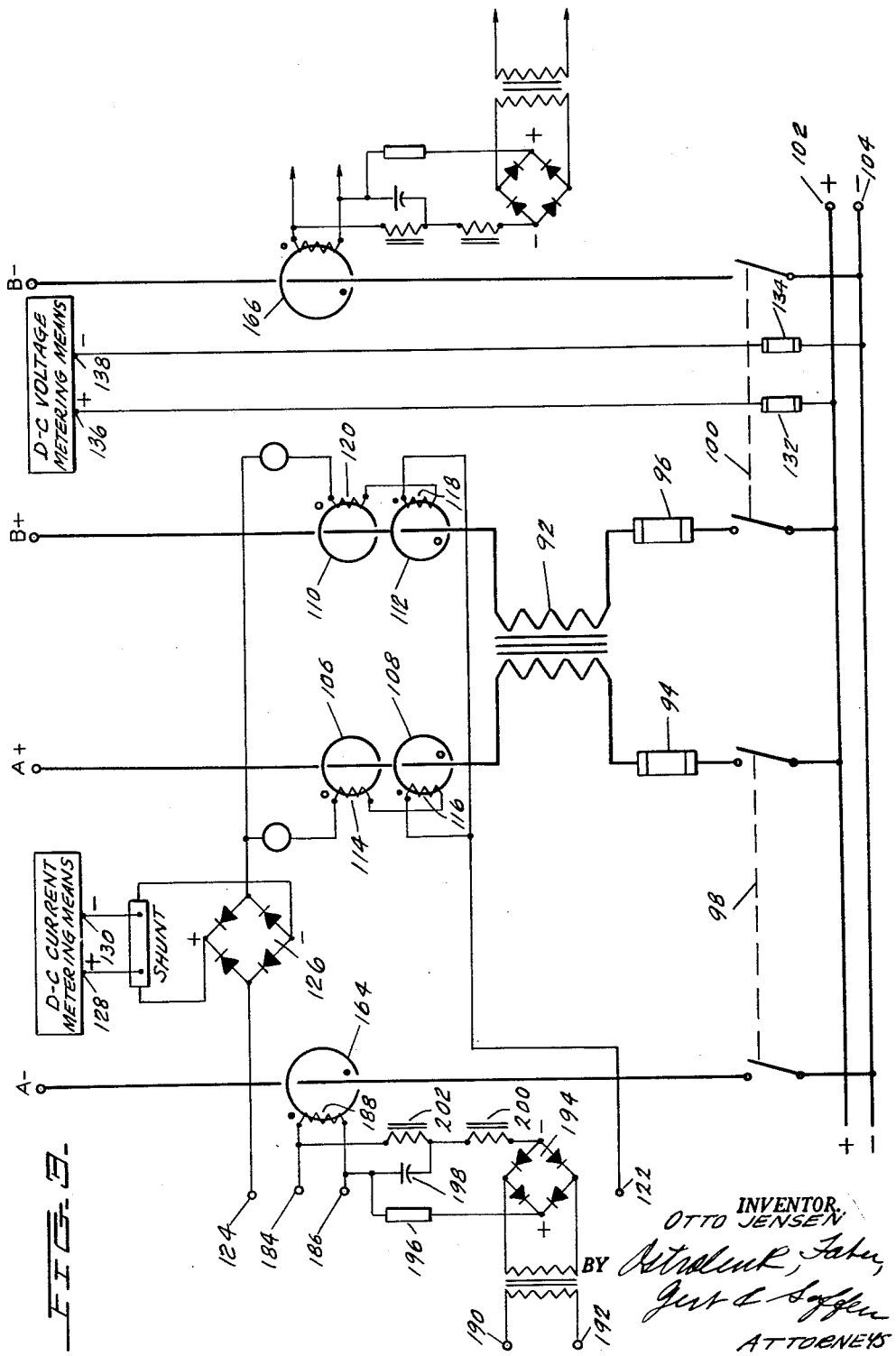

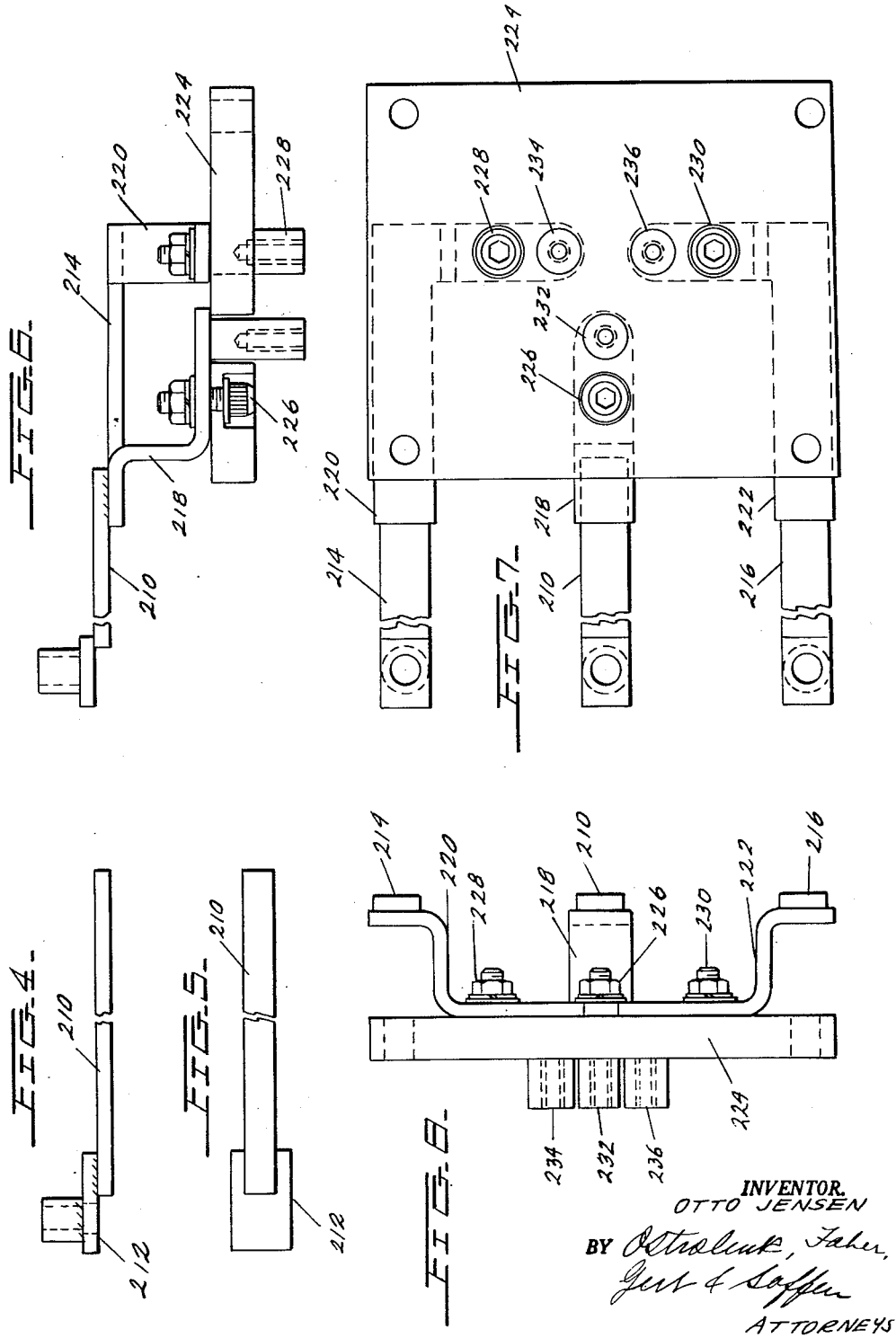

3,067,375
HIGH IMPEDANCE SHORT-CIRCUITER FOR
SEMI-CONDUCTOR RECTIFIERS
Otto Jensen, Malvern, Pa., assignor to I-T-E Circuit
Breaker Company, Philadelphia, Pa., a corporation of
Pennsylvania
Filed July 27, 1959, Ser. No. 829,991
15 Claims. (Cl. 321—14)

My invention relates to a circuit connection for short-circuiters for rectifier elements of the semi-conductor type wherein a relatively high impedance operates to short circuit the rectifier elements being protected.

Short-circuiting equipment for the protection of electrical components is well known, and is shown typically in applications Serial No. 757,560, filed August 27, 1958, which operates to protect the contacts of a mechanical rectifier, and Serial No. 717,145, filed February 24, 1958, now abandoned, illustrates short-circuiter equipment for protecting semi-conductor rectifier elements.

The concept of short-circuit protection is used where extremely high speed protection is desired, and normally comprises the closing of an extremely low impedance circuit in parallel with the equipment to be protected responsive to the occurrence of a fault condition. In order to fully protect the equipment such as rectifier contacts of a mechanical rectifier, the concept has been to achieve as low an impedance connection as is possible. I have found that such an extremely low impedance connection, which has been necessary in equipment such as a mechanically driven contact which operates as a rectifier, is not desirable or necessary where the protection involves semi-conductor rectifiers. In the present invention, I purposely introduce impedance into the short-circuiting path which may be across the semi-conductor rectifiers being protected or across the A.-C. line, as by using a steel bus bar in the circuit which is closed in parallel with the rectifier.

As previously mentioned, the contacts of mechanical rectifiers have previously been protected by extremely low short circuit paths so as to reduce fault currents through the contacts to a minimum, and to extinguish any backfire arc when the voltage across the contacts reverses. I have recognized, however, that since semi-conductor cells are natural valves having a definite threshold forward voltage, the problems of proper commutation and excitation in the mechanical type of rectifier are eliminated, and that the previous low impedance requirement may be eliminated.

By purposely introducing an impedance into the short-circuiter connection, I now limit the short-circuit current drawn through the rectifier transformer and switching apparatus, and drop the A.-C. secondary voltage only enough to reduce the load current to some minimum value which can be safely handled by semi-conductor cells and the switching apparatus.

In order to protect the rectifier unit itself against excessive load currents, it is only necessary to reduce the A.-C. secondary voltage to any of the following values:

(a) The normal D.-C. bus voltage, if other units in parallel maintain this voltage at a given level.

(b) The polarizing voltage of chemical load cells, if only one unit is on the line, and no other units are in parallel with the unit being protected.

(c) The threshold voltage of the rectifier cells where the fault occurs in the D.-C. system, or the load is resistive.

(d) A voltage which limits the rectifier cell current to a safe value until the A.-C. breaker trips in response to the fault.

Clearly, the precise magnitude to which the voltage is to be limited is a design parameter depending upon the particular installation.

Some of the advantages of my novel relatively high impedance short-circuiter are that:

(a) There is a smaller A.-C. voltage dip in the primary A.-C. system when the short circuiter operates.

(b) The short-circuit forces in the rectifier transformers and associated equipment is reduced.

(c) The interrupting duty on the A.-C. switching means is reduced.

(d) The short circuiters themselves have a lower required short-circuit capacity so that they may have a faster operation.

(e) Protective fuses associated with the A.-C. breaker may be smaller and may be coordinated with the A.-C. breaker so that the fuse clears the line only in case of a transformer fault, while the short-circuiter operates independently of the primary fuse without blowing the primary fuse.

In view of the above, a primary object of my invention is to provide a novel short-circuiter system for protecting semi-conductor rectifiers.

Another object of my invention is to provide a relatively high impedance connection on rectifier units which short-circuits the rectifiers responsive to a fault in the rectifier system.

A still further object of my invention is to provide a relatively high impedance short-circuiter for semi-conductor rectifiers which substantially limits the short-circuit current carried by the rectifier system elements during a fault, and reduces the interrupting duty of the A.-C. switching means.

These and other objects of my invention will become apparent from the following description when taken in connection with the drawings, in which:

FIGURE 1 shows a circuit diagram of one-half of a multiphase rectifier system equipped with a short-circuiter for protecting the semi-conductor rectifiers of the system, and is connected through a relatively high impedance bus connection.

FIGURE 2 schematically illustrates the plurality of parallel connected diode elements and protective fuses therefor for each of the diode positions of FIGURE 1.

FIGURE 3 illustrates the D.-C. circuitry connected to the D.-C. output of FIGURE 1 for both sides of the rectifier apparatus.

FIGURE 4 is a side view of one of the high impedance bus connectors for connecting the short-circuiter of FIGURE 1 to the rectifying apparatus.

FIGURE 5 is a top view of the high impedance conductive strap of FIGURE 4.

FIGURE 6 is a side view which illustrates the manner in which the high impedance conductive straps of FIGURES 4 and 5 are connected to the short circuiter.

FIGURE 7 is a top view of FIGURE 6.

FIGURE 8 is a front view of FIGURE 7.

Referring now to FIGURE 1, I have shown one-half of a multiphase rectifier system which is energized by an A.-C. source connected to terminals 20, 22 and 24 through a three-phase A.-C. breaker 26. A.-C. terminal 24 is connected to a positive first and second series connected semi-conductor rectifier elements 28 and 30, respectively, and to a negative first and second series connected semi-conductor rectifier elements 32 and 34, respectively.

For high current capacity, rectifier elements 28 through 34 may be comprised of a plurality of parallel connected elements, as will be more fully illustrated in FIGURE 2 for any one of the diode positions of FIGURE 1.

As was the case for the phase including terminal 24, terminal 22 is connected to positive rectifier elements 36 and 38 and negative rectifier elements 40 and 42, while the phase including terminal 20 is connected to positive elements 44 and 46 and negative rectifier elements 48 and 50. The terminals of rectifier elements 28, 36 and 44 are then connected to a common bus which is brought out to a positive terminal A+, which is the positive terminal of the rectifier portion under consideration in FIGURE 1. In a like manner, rectifiers 34, 42 and 50 are connected together on a common bus and brought out to a negative D.-C. terminal A—.

Capacitors 28a, 32a, 36a, 40a, 44a and 48a are connected across each of the arms of the bridge connection including diodes 28, 32, 36, 40, 44 and 48, respectively, and act as a by-pass for the diodes for voltage surges on the A.-C. line.

As previously indicated, rectifier elements 28 through 50 may be comprised of a plurality of parallel connected elements for attaining greater current capacity. This configuration is illustrated in FIGURE 2 which illustrates a single diode position where twenty diodes are connected in parallel. Thus, in FIGURE 2, a common bifurcated bus 52 receives the positive terminal of the diodes, such as diode 54. The other terminal of each of the parallel connected diodes, such as diode 54, is then connected to the other bifurcated bus 56.

The two bifurcated buses 52 and 56 are illustrated as having terminals 58 and 60. To more properly illustrate the connection between FIGURE 1 and FIGURE 2, the position of terminals 58 and 60 in FIGURE 1 are illustrated for the case of diode 28. Clearly, each of diodes 28 through 50 will be replaced by such a plurality of parallel connected elements in accordance with FIGURE 2 where the current capacity of the rectifier system is such as to require twenty parallel connected elements in each arm of the bridge system.

In order to balance the current between each of the parallel connected rectifier elements of FIGURE 2, I have schematically illustrated the use of a balancing iron system including a first lamination stack 62 and a second lamination stack 64 which operates as coupling reactors for the various parallel connected elements, in accordance with copending applications Serial No. 628,324, filed December 14, 1956, now Patent No. 2,994,028, and Serial No. 732,868, filed May 5, 1958, now Patent No. 2,945,961.

Each of the diodes of FIGURE 2 is further shown as being connected in series with a current limiting fuse, such as current limiting fuse 66 associated with diode 54. These current limiting fuses operate to remove their respective diode from the system in the case of a fault of the diode, as described in copending application Serial No. 718,294, filed February 28, 1958, now Patent No. 2,932,781, and operate in combination with the voltage balancing transformer system including voltage balancing transformers 68 and 70, as is further described in above noted copending application Serial No. 718,294, filed February 28, 1958. The transformers 68 and 70 are energized from the A.-C. source through the multiphase A.-C. circuit breaker 72, and the secondary windings of these transformers are so arranged as to first balance or properly maintain a division of voltage between series connected diodes, such as diodes 28 and 30, and additionally operate responsive to a fault in any one of the diode elements, such as diode 54, to deliver a high energy pulse through a diode which faults so that its respective fuse 66 will be operated.

In order to inform operating personnel of a fault of one of the plurality of diodes, or that a predetermined number of diodes have faulted so as to require replacement, each phase of the auxiliary A.-C. power supply including circuit breaker 72 is adapted with reactor cores 74, 76 and 78. The operation of this circuit is fully described in copending application Serial No. 73,451, filed December 2, 1960, which describes how the increase in current responsive to a diode failure actuates the reactors 74, 76 or 78.

The D.-C. power generated at terminals A+ and A— of FIGURE 1 is further traced in FIGURE 3 beginning at terminals A— and A+ at the top of FIGURE 3. FIGURE 3 also indicates the output D.-C. voltage from terminals B— and B+ of the other half of the rectifier unit not shown in FIGURE 1.

As illustrated in FIGURE 3, the output D.-C. voltage of the two halves of the rectifier system is combined in an interphase transformer 92, and the buses A+ and B+ are connected through main fuses 94 and 96 respectively, and thence through disconnect switches 98 and 100 respectively to the main output D.-C. bus bars 102 and 104.

The metering system for measuring the output voltage is of the well known transducer or magnetic amplifier type which includes saturable reactors 106, 108 110 and 112. These reactors have a main winding comprised of buses A+ and B+ for reactors 106—108 and 110—112 respectively, and biasing windings 114, 116, 118 and 120 which are energized from an auxiliary A.-C. source connected to terminals 122 and 124. The output of the A.-C. voltage imposed upon windings 114 through 120 is rectified by rectifier 126, and is delivered to a metering means at terminals 128 and 130 for indicating the output D.-C. current of buses 102 and 104.

The output D.-C. voltage is measured directly across buses 102 and 104 in the circuit including fuses 132 and 134, and is delivered to a D.-C. volt meter at terminals 136 and 138.

The short-circuiter protection of the rectifier system described above is shown in FIGURE 1 as including a schematically illustrated short-circuiter 140. Short-circuiter 140 is illustrated as an explosive type of short-circuiter, as shown in my U.S. Patent No. 2,888,538, issued May 26, 1959, although it will be apparent to those skilled in the art that any type of short-circuiter equipment can be used. The short-circuiter 140 is illustrated as having three contacting elements 142, 144 and 146, and a central normally disconnected bridging element 148. Contact 144 is connected to the junction of diodes 30 and 32 of the input phase including terminal 24, and terminals 142 and 146 are connected to the phases including terminals 22 and 20 respectively.

The purpose of short-circuiter 140 is to bring all of contacts 142, 144 and 146 into electrical connection with one another so that terminals 20, 22 and 24 are connected together, and the diode elements 28 through 50 are short-circuited on the A.-C. side. As previously described, this connection, in the past, has purposely been made to have as low an impedance as is possible. In accordance with the present invention, however, I purposely make this impedance a relatively large value, and particularly achieve this by making bus bars 150, 152 and 154 which connect the short-circuiter contacts 142, 144 and 146 to phases 22, 24 and 20, respectively, of a relatively high resistance material, such as steel rather than the normally used bus conductor of copper or aluminum.

The centrally positioned contact element 148 is, as described in my above noted U.S. Patent No. 2,888,538, a conductive cylinder having an explosive charge therein. When the short-circuiter is to be operated, a voltage is applied to the explosive charge over conductors 156 and 158 to detonate the explosive and cause the conductive walls of the cylinder 148 to expand into contact with contacts 142, 144 and 146. This signal is generated in the manner shown in FIGURES 1 and 2 as including a normally charged capacitor 160 which is discharged through an arc gap 162 responsive to a fault or overcurrent, as measured by the transducer system including saturable reactor core 164 of FIGURE 3.

An identical short-circuiter control system including saturable reactor core 166 on the bus including terminal B— of FIGURE 3 is used for a short-circuiter associated with the other half of the equipment not shown in FIGURE 1.

Referring now to the control equipment for delivering the stored energy of capacitor 160 to conductors 156 and 158 of FIGURE 1, I provide an arc discharge means 162 having electrodes 168, 170 and 172. Capacitor 160 is normally charged from an auxiliary A.-C. circuit connected to terminals 174 and 176, the voltage of which is stepped up by transformer 178 and rectified by diode 180. Accordingly, the top of capacitor 160 will be charged positively through this charging circuit. Capacitor 160 is then connected across electrodes 168 and 172 through explosive charge element 148 with the voltage division between the electrodes 168, 170 and 172 being maintained by resistors 174 and 176.

The firing circuit for firing arc means 162 and thus delivering pulse energy from capacitor 160 through electrode 168, electrode 172 to conductors 156 and 158 includes an input circuit connected to electrodes 170 and 172 which has a capacitor 182, and is connected to terminals 184 and 186. Terminals 184 and 186 are shown in FIGURE 3, and are connected across the output winding 188 of transducer core 164. Transducer core 164 is normally saturated in a first direction by the D.-C. current in the bus including terminal A—. A D.-C. bias is applied to winding 188, and includes an auxiliary A.-C. source connected to terminals 190 and 192, the current of which is rectified by a rectifier 194. To deliver a smooth D.-C. current to winding 188, a filtering circuit including resistor 196, capacitor 198 and inductors 200 and 202 are connected in the output of rectifier 194. These elements are also used to block the voltage pulse of the winding 188 from the D.-C. bias circuit so as to not damage D.-C. bias current components and direct the pulse to the firing circuit. The bias thus applied to winding 188 opposes the magnetomotive force induced in transductor core 164 by the D.-C. bus so that upon a failure of the rectifier system or D.-C. overload, the increasing current in the bus including terminal A— will quickly drive core 164 through unsaturation to deliver a sharp voltage pulse to terminals 184 and 186. This voltage pulse will, in FIGURE 1, cause the firing of arc means 162 so that capacitor 160 will discharge across wires 156 and 158 and through the explosive charge of the cylindrical conductive member 148. As previously described, this will cause the short-circuiting of contacts 142, 144 and 146, and thus short-circuit the diode elements 28 through 50 on the A.-C. side.

As has been heretofore described, the impedance or resistance of the steel bus bars 150, 152 and 154 will be of a value depending upon the particular rectifier system values. Note that this impedance need not be steel bus bars, but could, for example, be a resistive member or impedance member connected in circuit relation with normal high conductivity bus members. Thus, the value of the impedance may be adjusted, for example, to a value which will limit the rectifier cell current to cells connected to terminals 102 and 104 of FIGURE 3 to a safe value until the A.-C. breaker 26 trips. In any event, the diodes 28 through 50 will be short-circuited by their respective bus elements, and will be protected by the high impedance short circuit until the A.-C. source is disconnected from the rectifier system. This impedance, however, is not so high that an excessive voltage will be applied to the diodes.

If the impedance is obtained through the use of steel bus bars, as illustrated in FIGURE 1, it may be preferable to have the bus bars all of the same length and same cross-sectional area so that the same impedance is connected in each phase, or the bus bars could be of different lengths and varying cross-sections to control their impedance values.

One typical physical arrangement of the bus bars of FIGURE 1 is shown in FIGURES 4 through 8 where FIGURES 4 and 5 illustrate a typical bus bar 210 of steel which has a terminal member 212 connected at one end thereof for connection to the A.-C. bus bars.

As shown in FIGURES 6, 7 and 8, three bus bars 210 (of FIGURES 4 and 5), 214 and 216, all of which are of a relatively low conductivity material, are provided for each of three phases, such as the phases of FIGURE 1 including terminals 20, 22 and 24. The right end in FIGURES 6 and 7 is welded to angles 218, 220 and 222 respectively which are bolted to the short-circuiter frame 224 by bolt means 226, 228 and 230. The conductors 210, 214 and 216 then extend beyond their bolted positions to engage tubular conductors 232, 234 and 236 respectively which extend through housing 224 and support contacts 142, 144 and 146 of FIGURE 1.

Clearly, an explosive cartridge having a conductive casing is inserted centrally of these three conductors to achieve the short-circuiting action as disclosed in the previously noted U.S. Patent No. 2,888,538.

Although I have described preferred embodiments of my novel invention, many variations and modifications will now be obvious by those skilled in the art, and I prefer therefore to be limited not by the specific disclosure herein but only by the appended claims.

I claim:

1. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition.

2. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition; said rectifier being of semi-conductor material.

3. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition; said normally non-conductive means including a pair of contact members normally in a disengaged position and movable to an engaged position responsive to said predetermined fault conditions.

4. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition; said relatively high impedance means including circuit conductors of relatively high resistivity material.

5. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition; said relatively high impedance means including circuit conductors of steel.

6. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means with respect to a copper conductive means of similar cross-section in series therewith and connecting a relatively high impedance short-circuit across said rectifier responsive to said fault condition; said rectifier being of semiconductor material; said normally non-conductive means including a pair of contact members normally in a disengaged position and movable to an engaged position responsive to said predetermined fault conditions.

7. A short-circuiter for a rectifier; said short-circuiter including normally non-conductive means connected in parallel with said rectifier; said normally non-conductive means being rendered conductive responsive to predetermined fault conditions; said normally non-conductive means having a relatively high impedance means in series therewith and connecting a relatively high impedance short-circuit across said rectifier responsive to said fault condition; said rectifier being of semi-conductor material; said normally non-conductive means including a pair of contact members normally in a disengaged position and movable to an engaged position responsive to said predetermined fault conditions; said relatively high impedance means including circuit conductors of steel.

8. In a system for exchanging energy between an A.-C. system and a D.-C. system; a plurality of rectifier elements connected in series with said A.-C. system and said D.-C. system; a short-circuiter means for said rectifier elements; said short-circuiter means being connected in parallel with said rectifier elements by circuit connecting means; said short-circuiter means including a pair of cooperable contacts normally held in a disengaged position to normally open the parallel circuit formed by said short-circuiter; said pair of cooperable contacts being moved to an engaged position responsive to a predetermined fault in said system; said circuit connecting means including a relatively high impedance means with respect to a copper conductor of similar cross-section.

9. In a system for exchanging energy between an A.-C. system and a D.-C. system; a plurality of rectifier elements connected in series with said A.-C. system and said D.-C. system; a short circuiter means for said rectifier elements; said short circuiter means being connected in parallel with said rectifier elements by circuit connecting means; said short-circuiter means including a pair of cooperable contacts normally held in a disengaged position to normally open the parallel circuit formed by said short-circuiter; said pair of cooperable contacts being moved to an engaged position responsive to a predetermined fault in said system; said circuit connecting means including a relatively high impedance means formed by at least a partial length of steel in said circuit conducting means.

10. In a system for exchanging energy between an A.-C. system and a D.-C. system; a plurality of rectifier elements connected in series with said A.-C. system and said D.-C. system; a short circuiter means for said rectifier elements; said short-circuiter means being connected in parallel with said rectifier elements by circuit connecting means; said short-circuiter means including a pair of cooperable contacts normally held in a disengaged position to normally open the parallel circuit formed by said short-circuiter; said pair of cooperable contacts being moved to an engaged position responsive to a predetermined fault in said system; said circuit connecting means including a relatively high impedance means with respect to a copper conductor of similar cross-section; said rectifier elements being semi-conductor diodes.

11. In a system for exchanging energy between an A.-C. system and a D.-C. system; a plurality of rectifier elements connected in series with said A.-C. system and said D.-C. system; a short-circuiter means for said rectifier elements; said short-circuiter means being connected in parallel with said rectifier elements by circuit connecting means; said short-circuiter means including a pair of cooperable contacts normally held in a disengaged position to normally open the parallel circuit formed by said short-circuiter; said pair of cooperable contacts being moved to an engaged position responsive to a predetermined fault in said system; said circuit connecting means including a relatively high impedance means; said rectifier elements being semi-conductor diodes formed by at least a partial length of steel in said circuit conducting means.

12. In a multiphase rectifier system for energizing a D.-C. load from an A.-C. source; each phase of said multiphase rectifier system including a rectifier element; a short-circuiter for short-circuiting each of said rectifier elements responsive to predetermined fault conditions; said short-circuiter including a contact element corresponding to the A.-C. input of each of said rectifier elements and a common contact for connecting each of said contact elements to one another responsive to said predetermined fault conditions; conductive means for each of said contact elements for electrically connecting said contact elements to the respective A.-C. input of said corresponding rectifier elements; each of said conductive means including a relatively high resistance means with respect to a copper conductor of similar cross-section.

13. In a multiphase rectifier system for energizing a D.-C. load from an A.-C. source; each phase of said multiphase rectifier system including a rectifier element; a short-circuiter for short-circuiting each of said rectifier elements responsive to predetermined fault conditions; said short-circuiter including a contact element corresponding to the A.-C. input of each of said rectifier elements and a common contact for connecting each of said contact elements to one another responsive to said predetermined fault conditions; conductive means for each of said contact elements for electrically connecting said contact elements to the respective A.-C. input of said corresponding rectifier elements; each of said conductive means being a relatively high resistivity conductor with respect to a copper conductor of similar cross-section.

14. In a multiphase rectifier system for energizing a D.-C. load from an A.-C. source; each phase of said multiphase rectifier system including a rectifier element; a short-circuiter for short-circuiting each of said rectifier elements responsive to predetermined fault conditions; said short-circuiter including a contact element corresponding to the A.-C. input of each of said rectifier elements and a common contact for connecting each of said contact elements to one another responsive to said predetermined fault conditions; conductive means for each of said contact elements for electrically connecting said contact elements to the respective A.-C. input of said corresponding rectifier elements; each of said conductive means being a steel conductor.

15. In a multiphase rectifier system for energizing a D.-C. load from an A.-C. source; each phase of said multiphase rectifier system including a rectifier element; a short-circuiter for short-circuiting each of said rectifier elements responsive to predetermined fault conditions; said short-circuiter including a contact element corresponding to the A.-C. input of each of said rectifier elements and a common contact for connecting each of said contact elements to one another responsive to said predetermined fault conditions; conductive means for each of said contact elements for electrically connecting said contact elements to the respective A.-C. input of said corresponding rectifier elements; each of said conductive means being a steel conductor; said rectifier elements being semi-conductor elements.

References Cited in the file of this patent

UNITED STATES PATENTS

| | | |
|---|---|---|
| 2,672,584 | Rolf | Mar. 16, 1954 |
| 2,810,865 | Minder | Oct. 22, 1957 |
| 2,872,634 | Kleinvogel et al. | Feb. 3, 1959 |
| 2,969,495 | Mosch et al. | Jan. 24, 1961 |